(12) United States Patent
Kone (10) Patent No.: US 8,914,027 B2
(45) Date of Patent: Dec. 16, 2014

(54) METHOD OF INITIATING HANDOVER PRE-PREPARATION AND RELATED COMMUNICATION DEVICE

(75) Inventor: Mamadou Kone, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 583 days.

(21) Appl. No.: 12/822,198

(22) Filed: Jun. 24, 2010

(65) Prior Publication Data

US 2010/0330993 A1 Dec. 30, 2010

Related U.S. Application Data

(60) Provisional application No. 61/220,206, filed on Jun. 25, 2009.

(51) Int. Cl.
*H04W 36/00* (2009.01)
*H04W 84/04* (2009.01)

(52) U.S. Cl.
CPC ........ *H04W 36/0055* (2013.01); *H04W 84/045* (2013.01)
USPC ............................ 455/436; 455/437; 455/423

(58) Field of Classification Search
USPC ........ 455/423, 437, 414.1, 422.1, 550.1, 436; 370/331
See application file for complete search history.

(56) References Cited

U.S. PATENT DOCUMENTS

| 7,769,384 | B2 | 8/2010 | Lee |
| 2008/0025263 | A1 | 1/2008 | Pelkonen |
| 2010/0124203 | A1* | 5/2010 | Tenny et al. ................... 370/331 |
| 2010/0195640 | A1* | 8/2010 | Park et al. ...................... 370/350 |
| 2010/0238799 | A1* | 9/2010 | Sebire ............................ 370/225 |
| 2010/0255807 | A1* | 10/2010 | Umatt et al. ............... 455/404.1 |

FOREIGN PATENT DOCUMENTS

| CN | 1930903 A | 3/2007 |
| CN | 101473679 A | 7/2009 |
| CN | 101848517 A | 9/2010 |
| WO | 2008023204 A1 | 2/2008 |

OTHER PUBLICATIONS

3GPP TS 36.300 V8.8.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2009.
3GPP TS 36.300 V9.0.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), Jun. 2009.
Office action mailed on Nov. 5, 2012 for the China application No. 201010221484.4, filed Jun. 25, 2010, p. 1-8.

(Continued)

*Primary Examiner* — Kwasi Karikari
(74) *Attorney, Agent, or Firm* — Winston Hsu; Scott Margo (57) ABSTRACT

A method of initiating handover pre-preparation for a mobile device in a wireless communication system is disclosed. The method comprises the steps of receiving a pre-prepared handover command from a source base station, wherein the pre-prepared handover command includes context of a target base station, whereby the mobile device does not perform a handover procedure based on the pre-prepared handover command and keeping the context for a period of time.

9 Claims, 8 Drawing Sheets

(56) References Cited

OTHER PUBLICATIONS

Office action mailed on Sep. 30, 2013 for the China application No. 201010221484.4, filing date Jun. 25, 2010, p. 1-8.
3GPP, "3rd Generation Partnership Project; Technical Specification Group Core Network and Terminals; Handover procedures (Release 8)", 3GPP TS 23.009 V8.1.0 (Mar. 2009), cover page and p. 2-5, 25, 36.
Office action mailed on Apr. 11, 2014 for the Taiwan application No. 099120955, filing date: Jun. 25, 2010, p. 1-8.

* cited by examiner

METHOD OF INITIATING HANDOVER PRE-PREPARATION AND RELATED COMMUNICATION DEVICE

CROSS REFERENCE TO RELATED APPLICATIONS

This application claims the benefit of U.S. Provisional Application No. 61/220,206, filed on Jun. 25, 2009 and entitled "Methods for preparing in advance and conditionally executing handover in wireless communications system" the contents of which are incorporated herein.

BACKGROUND OF THE DISCLOSURE

1. Field of the Disclosure

A method used in a wireless communication system and related communication device are disclosed, and more particularly to, a method of initiating handover pre-preparation for a wireless communication system and related communication device.

2. Description of the Prior Art

A long-term evolution (LTE) system, initiated by the third generation partnership project (3GPP), is now being regarded as an evolved 3G (third generation) radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile devices, also referred as user equipments (UEs).

In order to maintain service continuity as a user moves, the UE must not only be connected to a serving cell but importantly also monitor their neighbor cells. This monitoring is an ongoing activity, since propagation conditions to different eNBs can change rapidly at any point in time. Typically the efforts by the UE and the network will always be directed toward providing service continuity on a preferred radio access technology (RAT) according to a given preference criterion which may, for example, include quality of service (QoS), cost or network operator. While the UE has service with its preferred network, the UE may be requested to perform mobility decision (handover or cell reselection) towards other base stations from the same radio access technology (RAT) according to a measurement report. The handover is an important function that maintains seamless connectivity when transitioning from one base station to another. There are two types of handover: intra-RAT, which is within one radio access technology (i.e. LTE-to-LTE from one eNB to another), and inter-RAT between radio access technologies. Inter-RAT could be between LTE and GSM or 3G WCDMA, 3GPP2, WiMAX or even wireless LAN. These non-LTE handovers are being defined for the LTE standard.

In the LTE system defined by 3GPP, the logical connection between the UE and the E-UTRAN is defined by radio resource control (RRC) connection states. The RRC connection states of the UE contain an RRC_IDLE state and an RRC_CONNECTED state. Mobility control in RRC_IDLE is UE-controlled (e.g. cell reselection) while in RRC_CONNECTED it is controlled by the E-UTRAN. The E-UTRAN decides to which cell the UE should handover in order to maintain the radio link and preserve service continuity. The E-TURAN may take into account not only the radio link quality but factors such as UE capability, subscriber type and access restrictions. Normally, the E-UTRAN configures the UE to report measurements of the candidate target cells. The message sequence for the handover within the LTE is described as follows: The UE sends a MeasurementReport message to a source base station (e.g. source eNB). Before sending a handover command to the UE, the source base station requests one or more target cells to prepare for the handover. To prepare the handover at the target side, the source base station issues a handover request to the target base station passing all necessary information. If resources can be granted by the target base station, the target base station configures the required resources according to the received information and sends a handover response to the source base station. The handover response may include mobility control information and the radio resource configuration of the target base station. The source base station will forward this information to the UE through the handover command. The source base station does not add or modify the information included in the handover response. As soon as the source base station receives the handover response, or as soon as the transmission of the handover command is initiated in the downlink, data forwarding may be initiated.

Figure 1:
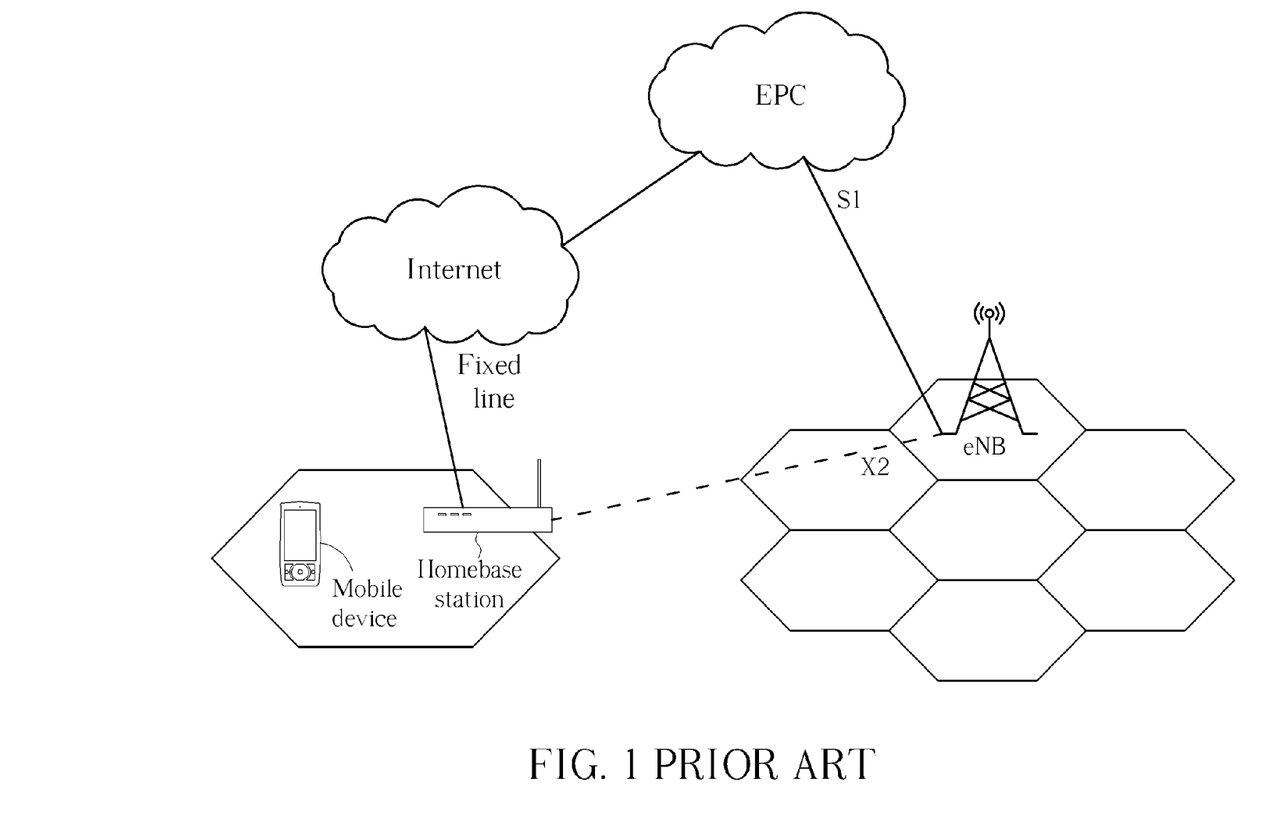
FIG. 1 illustrates a deployment scenario of a home base station according to an example.

A home base station, sometimes called a femto base station or a pico base station, is considered to be a promising solution for many issues in mobile communication networks, such as coverage, capacity, and cost. The home base station delivers a great user experience in homes, office buildings or schools, at very low cost, using customer's broadband access (e.g. digital subscriber line (DSL) or cable television backhaul). For this application, the home base station usually serves small cellular coverage that has a restricted group of users and only allows access and provides service to the restricted group of users, which can be referred as to a close subscriber group (CSG). Such cells providing the small cellular coverage are referred to as femto-cells, Home Node B (HNB) cells, Home e-Node B (HeNB) cells or, most commonly, CSG cells. A deployment scenario of the typical home base station involving the E-UTRAN is illustrated in FIG. 1. The home base station interconnects with the LTE Evolved Packet Core (EPC) over a fixed-line broadband access network. Similar to the eNBs, the home base station is also connected via the S1 interface to the EPC. In addition, the home base stations and eNBs may be interconnected with each other via the X2 interface. A mobile device receives radio signals from the home base station.

However, the backhaul device (e.g. a DSL router or a cable modem) may have a backhaul link failure due to the following situations: (1) the connection between the backhaul device and a local internet operator office may be disconnected due to unreliable copper line quality; (2) the connection from the home base station to the a gateway is congested; (3) User inadvertently shuts down power of the home base station or the backhaul device. When the backhaul link failure occurs, the serving home base station (i.e. the source base station) will not be capable to communicate with another home base station (i.e. the target base station) and a serving gateway. Namely, the source base station cannot hand over the RRC_CONNECTED UE to the target station before the RRC_CONNECTED UE initiate a radio link failure and goes to the RRC_IDLE state. Since the source base station needs to prepare handover with the target base station before sending the handover command to the UE. But the backhaul link failure does not involve in the handover preparation. In other words, the handover is not initiated due to the backhaul link failure. In the case of the backhaul link failure, the source base station cannot prepare for the handover and eventually the UE after some tries will go idle (i.e. enter the RRC_IDLE state).

In addition, the home base station is a user deployed and user managed device. Therefore, the home base station may be protected against random hazards from the same user and his environment. The following situations can crash down the home base station interrupting the air interface transmission. For example, wrong manipulations of the home base station device may break it down without the user notice. Also, in some geographical areas intermittent electricity cut is very frequent and this may be harmful to the home base station, not saying that it will cause the failure of the air interface. Or some inadvertent hazards can put the home base station out of work permanently, such as water pouring on the device, falling from its emplacement and so on. The UE may go idle when the serving home base station (i.e. source base station) does not handover the UE to another home base station (i.e. target base station) before the home base station is crashed down.

In 3GPP specification, two phases governs the behavior associated to the radio link failure. During the first phase, the UE discovers radio link problem that it has tries to resolve during a timer T1. After the timer T1 expires, the UE determines that the radio link failure is detected and the second phase starts. At the second phase, the UE starts another timer T2. During the timer T2, the UE tries to select a cell either from the same base station or different base station. If this operation fails and the timer T2 expires, the UE releases a radio resource control (RRC) connection and goes idle. At that point, the UE stops its ongoing activities and restarts a new cell search. If the UE select the cell that already has context of the UE, the UE can stay in RRC_CONNECTED state and resume its activities. Currently, the UE does not know how to select the cell having the context of the UE or the serving home base station (i.e. source base station) does not know how to prepare the handover with another home base station (i.e. target base station) to avoid the radio link failure. Besides, it is likely that every time the UE goes idle, the UE will try to switch to a macro cell base station (e.g. eNB). This may cause a ripple effect since the macro base station will be struggling to keep up with the onslaught of traffic that the macro base station is not ready to receive.

SUMMARY OF THE DISCLOSURE

A method of initiating handover pre-preparation for a mobile device in a wireless communication system is disclosed to prepare a handover procedure in advance.

A method of initiating handover pre-preparation for a mobile device in a wireless communication system is disclosed. The method comprises the steps of receiving a pre-prepared handover command from a source base station, wherein the pre-prepared handover command includes context of a target base station, whereby the mobile device does not perform a handover procedure based on the pre-prepared handover command and keeping the context for a period of time.

A communication device for initiating handover pre-preparation in a wireless communication system is disclosed. The communication device comprises a means for receiving a first pre-prepared handover command from a source base station, wherein the first pre-prepared handover command includes first context of a first target base station, whereby the mobile device does not perform a handover procedure based on the first pre-prepared handover command; and a means for keeping the first context for a period of time.

A method of initiating handover pre-preparation for a source base station in a wireless communication system is disclosed. The method comprises the steps of determining that a target base station is a candidate of a handover procedure corresponding to a mobile device according to a measurement report sent by the mobile device, sending a pre-prepared handover request to the target base station, wherein the pre-prepared handover request includes context of the mobile device and an indicator for indicating the handover pre-preparation or a normal handover preparation, receiving a pre-prepared handover response responding to the pre-prepared handover request, wherein the pre-prepared handover response includes the indicator and context of the target base station and forwarding the context of the target base station to the mobile device through a pre-prepared handover command when the indicator indicates the handover pre-preparation, whereby the pre-prepared handover command does not handover the mobile device from the source base station to the target base station.

A communication device for initiating handover pre-preparation in a wireless communication system is disclosed. The communication device comprises a means for determining that a target base station is a candidate of a handover procedure corresponding to a mobile device, according to a measurement report sent by the mobile device; a means for sending a pre-prepared handover request to the target base station, wherein the pre-prepared handover request includes context of the mobile device and an indicator for indicating the handover pre-preparation or a normal handover preparation; a means for receiving a pre-prepared handover response responding to the pre-prepared handover request, wherein the pre-prepared handover response includes the indicator and context of the target base station; a means for forwarding the context of the target base station to the mobile device through a pre-prepared handover command when the indicator indicates the handover pre-preparation; and whereby the pre-prepared handover command does not handover the mobile device from the source base station to the first target base station.

A method of initiating handover pre-preparation for a target base station in a wireless communication system is disclosed. The method comprising the steps of receiving the pre-prepared handover request sent by the source base station, wherein the pre-prepared handover request includes the indicator and the context of the mobile device for the handover pre-preparation; and sending the pre-prepared handover response responding to the first pre-prepared handover request to the source base station, wherein the pre-prepared handover response includes the indicator and the context of the target base station.

A communication device for initiating handover pre-preparation in a wireless communication system is disclosed. The communication device comprises a means for receiving the first pre-prepared handover request sent by the source base station, wherein the first pre-prepared handover request includes the indicator and the context of the mobile device for the handover pre-preparation; and a means for sending the first pre-prepared handover response responding to the first pre-prepared handover request to the source base station, wherein the first pre-prepared handover response includes the indicator and the context of the first target base station.

These and other objectives of the present disclosure will no doubt become obvious to those of ordinary skill in the art after reading the following detailed description of the examples that is illustrated in the various figures and drawings.

DETAILED DESCRIPTION

Figure 2:
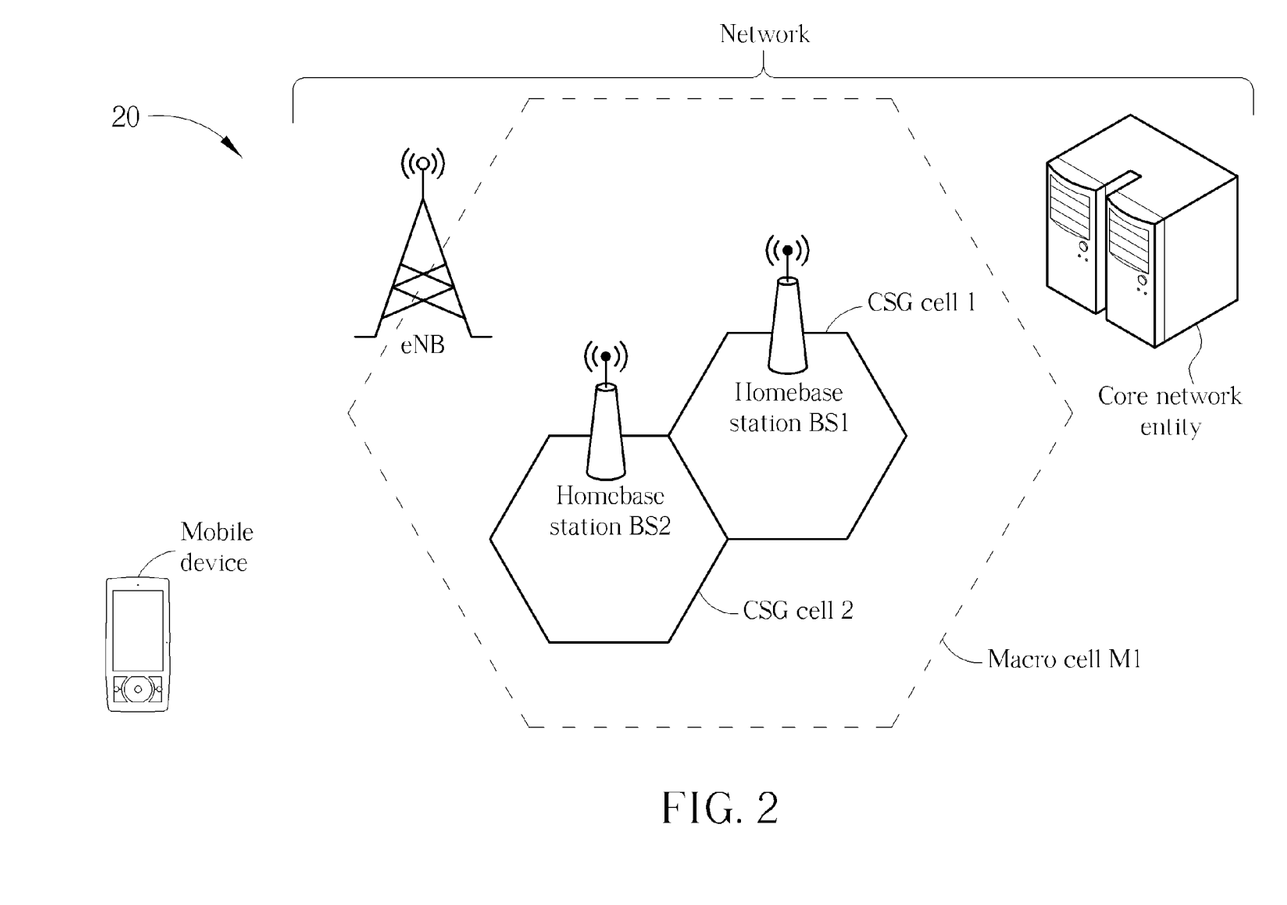
FIG. 2 illustrates a schematic diagram of a wireless communication system according to an example.

Please refer to FIG. 2, which illustrates a schematic diagram of a wireless communication system 20 according to an example. Briefly, the wireless communication system 20 is composed of a network and a plurality of mobile devices (only one is shown in FIG. 2). The wireless communication system 20 can be a UMTS (Universal Mobile Telecommunications System), an LTE (long-term evolution) system or any other similar network system. In the LTE system, the network can be referred as a EUTRAN (evolved-UTRAN) comprising a plurality of eNBs (only one is shown in FIG. 2), a plurality of home base stations and a core network entity (e.g. Mobility Management Entity called MME), whereas the mobile devices are referred as to user equipments (UEs). In FIG. 2, the eNB may serve a Macro cell M1. Within the Macro cell M1 are a CSG cell 1 associated with a home base station BS1 and a CSG cell 2 associated with a home base station BS2. The UEs can be devices such as mobile phones, computer systems, etc. This terminology will be used throughout the application for ease of reference, however, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 3:
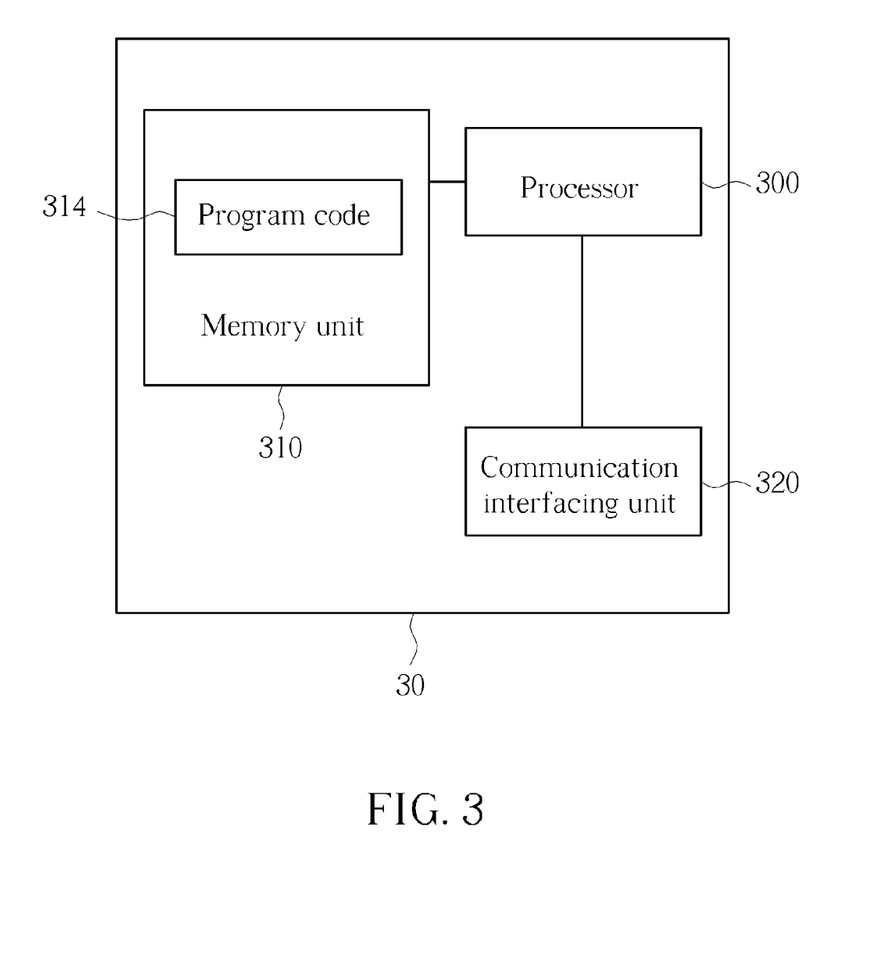
FIG. 3 illustrates a schematic diagram of a communication device according to an example.

Please refer to FIG. 3, which illustrates a schematic diagram of a communication device 30 according to an example. The communication device 30 may be the mobile devices or the network shown in FIG. 2 and may include a processor 300 such as a microprocessor or ASIC, a memory unit 310 and a communication interfacing unit 320. The memory unit 310 may be any data storage device that can store program code 314 for access by the processor 300. Examples of the memory unit 310 include but are not limited to a subscriber identity module (SIM), read-only memory (ROM), random-access memory (RAM), CD-ROMs, magnetic tapes, hard disks, and optical data storage devices. The communication interfacing unit 320 may be a radio transceiver and accordingly exchanges wireless signals according to processing results of the processor 300.

Figure 4:
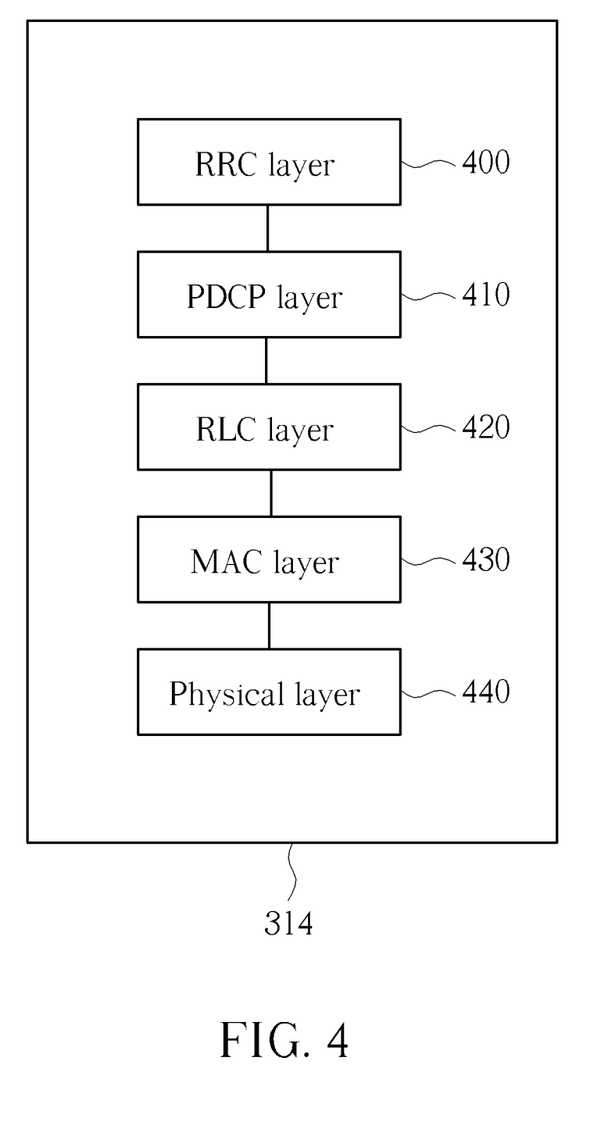
FIG. 4 illustrates a schematic diagram of the program code according to FIG. 3.

Please refer to FIG. 4, which illustrates a schematic diagram of the program code 314 for the LTE system according to an example. The program code 314 includes program code of multiple communications protocol layers, which from top to bottom are a radio resource control (RRC) layer 400, a packet data convergence protocol (PDCP) layer 410, a radio link control (RLC) layer 420, a medium access control (MAC) layer 430 and a physical (PHY) layer 440. When the communication device 30 is referred as to the mobile device shown in FIG. 2, the RRC layer 400 of the communication device 30 obtains various measurement results from the MAC layer 430 and the physical layer 440. Then, the RRC layer 400 generates a measurement report based on the obtained measurement results. The measurement report may be sent to the network (e.g. E-UTRAN) via a "MeasurementReport" message for reporting the communication system environment situation surrounding the communication device 30, e.g., communication quality of one or more cells around the communication device 30. Based on the measurement report, the network may trigger a handover procedure and decide which cell the UE should handover in order to maintain a radio link. To prepare the handover, the network may help the UE swap context with the base station of interest, as an intermediate. The radio link controlled by the RLC layer 420 may be disconnected, causing a radio link failure. There are two phases governing the behavior associated to the radio link failure. During the first phase, the UE discovers a radio link problem that it has tries to resolve during a timer T1. After the timer T1 expires, the UE determines that the radio link failure is detected and the second phase starts. At the second phase, the UE starts another timer T2. During the timer T2, the UE tries to select a cell either from the same base station or different base station.

Figure 5:
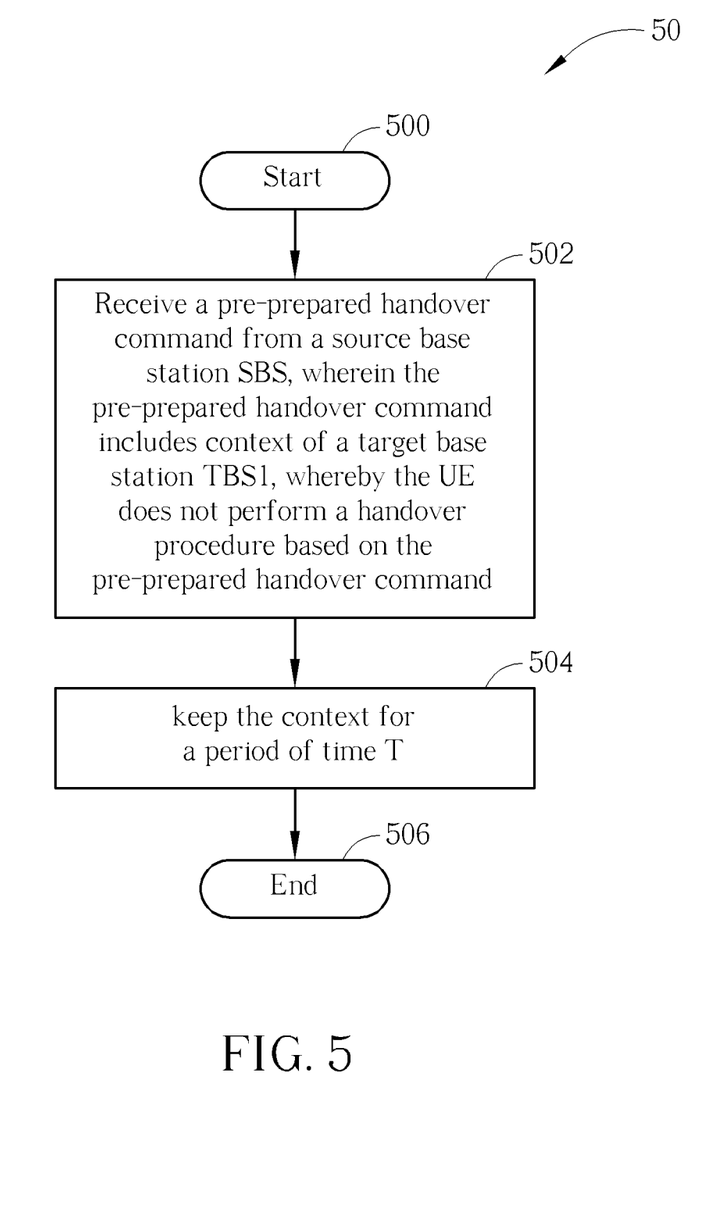
FIG. 5 is a flowchart of a process according to an example.

Please refer to FIG. 5, which is a flowchart of a process 50 according to an example. The process 50 is used for initiating handover pre-preparation for a UE in a wireless communication system (e.g. wireless communication system 20). The UE may be referred as to the communication device 30 shown in FIG. 3. The process 50 may be compiled into the program code 314 and include the following steps:

Step 500: Start.

Step 502: Receive a pre-prepared handover command from a source base station SBS, wherein the pre-prepared handover command includes context of a target base station TBS1, whereby the UE does not perform a handover procedure based on the pre-prepared handover command.

Step 504: keep the context for a period of time T.

Step 506: End.

According to the process 50, the UE may receive the pre-prepared handover command from the source base station SBS. The source base station SBS may be referred as to the home base stations BS1 and BS2 in FIG. 2. The pre-prepared handover command may be referred as to an RRCConnectionReconfiguration message. The pre-prepared handover command includes the context of the target base station TBS1. The target station TBS1 may be referred as to the home base stations BS1 and BS2 in FIG. 2. In some examples, the source base station SBS may be the same as the target base station TBS1. After receiving the pre-prepared handover command, the UE keeps the context for a period of time T rather than perform the handover procedure immediately. Namely, the UE does not handover to the target base station TSB1 when receiving the pre-prepared handover command. The context of the target base station TBS1 may include mobility control information (e.g. the cell identity and the frequency associated with the target base station TBS1), resource configuration, security configuration, a new cell-radio network temporary identifier (C-RNTI) and so on. If the source base station SBS has the aforementioned backhaul link failure or the source base station SBS becomes unreliable during the period of time T, the UE may receive a specific indication from the source base station SBS. According to the specific indication, the UE may handover to the target base station TBS1, using the saved context of the target base station TBS1. Thus, upon receiving the pre-prepared handover command, the UE may swap context with the target base station TBS1 in advance and keep the context of the target base station TBS1 for the period of time T. When the source base station SBS has the aforementioned backhaul link failure or the source base station SBS becomes unreliable during the period of time T, the UE may receive the specific indication and handover to the target base station TBS1 that the UE has switched its context with. This may keep the UE from entering RRC_IDLE state due to the aforementioned reasons (e.g. backhaul link failure).

Unfortunately, if the handover fails, the UE may start the aforementioned timer T2 associated with the second phase of the radio link failure to start cell reestablishment with any available target base station BS2 that may still have its context (e.g. from previous normal handover preparation). When the timer T2 expires, the UE may now go idle and starts new cell selection served by another target base station TBS2.

In some examples, the period of time could be controlled by a timer Tr1. In other words, when the UE obtains the context of the target base station TBS1 from the pre-prepared handover command, the UE may start the timer Tr1 and keep the context of the target base station TBS1 until the timer Tr1 expires. At this point, the UE and the target base station TBS1 may release the context of the target base station TBS1. In addition, the source base station SBS may find another target base station TBS2 having a better quality of service (QoS) according to the measurement report sent by the UE. In some examples, the source base station SBS may handover the UE to the target base station TBS2 by sending a normal handover command associated with the target base station TBS2. When receiving the normal handover command, the UE may release the context of the target base station TBS1 and the target base station TBS1 may release the context of the UE after the internal timer Tr2 expires without receiving any Handover complete message. In some examples, the source base station SBS may re-initiate a new handover preparation associated with the UE and the target base station TBS2. When receiving a new pre-prepared handover request and a new pre-prepared handover command, the UE and the target base station TBS1 may release the context of each other as well.

Besides, the specific indication may contain out-of-service information from the source base station SBS. The out-of-service information may indicate an out-of-service causes and duration of out-of-service, such as expected downtime, and expected uptime. The UE may determine whether to stay connected to a cell C1 (e.g. CSG cell 1 or CSG cell 2 shown in FIG. 2) served by the source base station SBS or to handover to the target base station TBS1 by using the saved context of the target base station TBS1, according to the out-of-service information. In other words, the UE may decide to stay connected to the current cell C1 if the expected downtime and/or the expected up time duration does not stop its ongoing activities and leads to RRC_IDLE state. If the expected down and/or the expected up time duration stops its ongoing activities, the UE may perform the handover procedure based on the context of the target base station TSB1 which have kept during the period of the time T.

In some examples, after the radio link failure is detected the UE may automatically perform the handover procedure, using the context of the target base station TBS1 without receiving any specific indication from the source base station SBS. When the UE detects an abnormal radio link, the UE may start the timer T1. When the abnormal radio link is not recovered before the timer T1 expires, the UE may determine that the radio link failure occurs. At the moment, the UE start a timer T2. During the time that timer T2 runs, the UE may perform the handover procedure to the target base station TBS1 using the saved context of the target base station TBS1. If the UE fails in handing over to the target base station TSB1, the UE may try to re-establish to a new cell C2 which is served by the target base station TBS2 if that cell still kept UE's context from previous normal handover preparation. The execution time of the handover procedure should be shorter than the duration of the timer T2. The handover procedure should be done before the timer T2 expires. In the other examples, the UE may perform the handover procedure to the target base station TBS1, using the saved context of the target base station TBS1 without starting the timer T2. If the UE fails in handing over to the target base station TBS1, the UE may start the timer T2. When the timer T2 expires, the UE may try to re-establish to the cell C2 which is served by the target base station TBS2 if that cell still kept UE's context from previous normal handover preparation.

Figure 6:
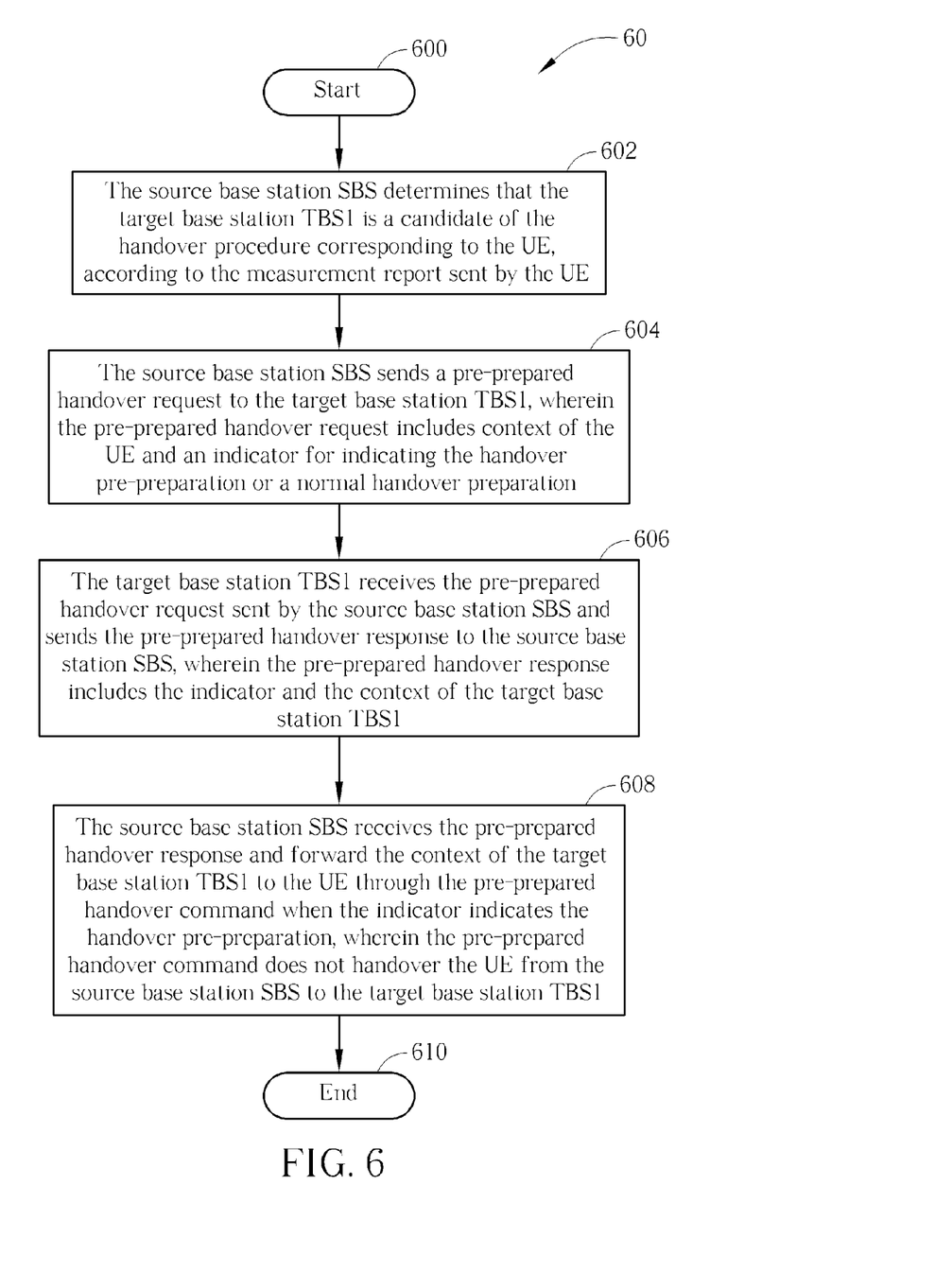
FIG. 6 is a flowchart of a process according to an example.

Please refer to FIG. 6, which is a flowchart of a process 60 according to an example. The process 60 is used for initiating handover pre-preparation for the source base station SBS and the target base station TSB1 in a wireless communication system (e.g. wireless communication system 20). The source base station SBS may be referred as to the communication device 30 shown in FIG. 3. The process 60 may be compiled into the program code 314 and include the following steps:

Step 600: Start.

Step 602: The source base station SBS determines that the target base station TBS1 is a candidate of the handover procedure corresponding to the UE, according to the measurement report sent by the UE.

Step 604: The source base station SBS sends a pre-prepared handover request to the target base station TBS1, wherein the pre-prepared handover request includes context of the UE and an indicator for indicating the handover pre-preparation or a normal handover preparation.

Step 606: The target base station TBS1 receives the pre-prepared handover request sent by the source base station SBS and sends the pre-prepared handover response to the source base station SBS, wherein the pre-prepared handover response includes the indicator and the context of the target base station TBS1.

Step 608: The source base station SBS receives the pre-prepared handover response and forward the context of the target base station TBS1 to the UE through the pre-prepared handover command when the indicator indicates the handover pre-preparation, wherein the pre-prepared handover command does not handover the UE from the source base station SBS to the target base station TBS1.

Step 610: End.

According to process 60, the source base station SBS may include an indicator in the pre-prepared handover request and send the pre-prepared handover request to the target base station TBS1. The pre-prepared handover request includes context of the UE. The indicator is used for indicating the handover pre-preparation or the normal handover preparation. Preferably, the indicator has a length of one bit. For example, a bit "0" may represent the normal handover preparation and a bit "1" may represent the handover pre-preparation. In some examples, the pre-prepared handover request is a HANDOVER REQUEST message with one-bit indicator included. The context of the UE may include the C-RNTI of the UE in the source base station SBS, the current access stratum (AS)-configuration, E-UTRAN Radio Access Bearer (E-RAB) context, etc. In response to the pre-preparation handover request, the target base station TBS1 sends the pre-preparation handover response to the source base station SBS. The pre-prepared handover response includes the indicator as well and the context of the target base station TBS1. The handover response may be referred as to a HANNDOVER REQUEST ACKOWLEDGE message with the one-bit indicator included. Namely, the indicator is included in the request message or the response message for distinguishing the pre-prepared handover request and the pre-prepared handover response from a normal handover request and a normal handover response, respectively. The context of the target base station TBS1 may include mobility control information (e.g. the cell identity and the frequency associated with the target base station TBS1), resource configuration, security configuration, a new cell-radio network temporary identifier (C-RNTI) and so on. After receiving the context of the target base station TBS1, the source base station SBS sends the pre-prepare handover command to the UE, thereby completing the context swapping of the target base station TSB1 and the UE. Briefly, the source base station SBS and the target base station TBS1 use the indicator to distinguish the handover pre-preparation from the normal handover preparation. When the indicator indicates the handover pre-preparation, the source base station SBS sends the pre-prepared handover command to the UE, which does not handover the UE to the target base station TBS1 immediately.

In addition, the pre-prepared request and the pre-prepared response may be associated with the timer Tr1 which is started by the UE for keeping the context of the target base station TBS1 for the period of time T. As mentioned above, after the source base station SBS forwards the context of the target base station TBS1 to the UE, the UE may keep the context of the target base station TBS1 until the timer Tr1 expires. According to the aforementioned measurement report sent by the UE, the source base station SBS may find another base station (e.g. the target base station TBS2) that can provide better QoS. In this situation, the source base station SBS may determine that the target base station TBS2 is a new candidate of the handover procedure and send a new pre-prepared handover request and a new pre-prepared handover command to the target base station TBS2 and the UE, respectively. At this moment, the target base station TBS1 may release the context of the UE when the timer Tr1 expires. In some example, the source base station SBS may send a normal handover request and a normal handover command to the target base station TBS2 and the UE, respectively, to handover the UE to the target base station TBS2. Besides, the source base station SBS may send the aforementioned out-of-service information to the UE when the source base station SBS is aware of a backhaul link failure.

Figure 7:
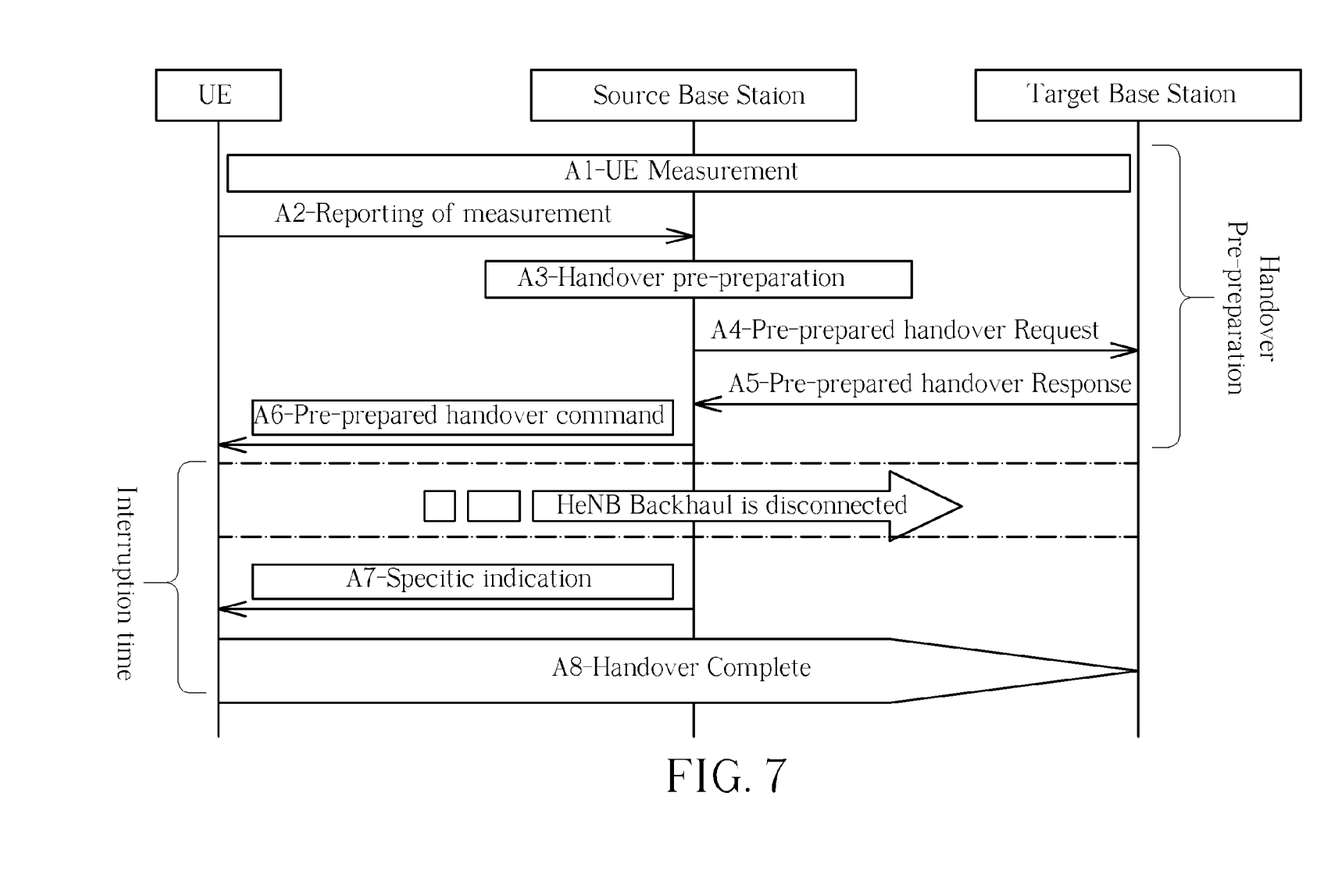
FIG. 7 is a signaling diagram according to an example.

Please refer to FIG. 7, which is a signaling diagram 70 according to an example. In the Steps A1 and A2, the UE obtains various measurement results and sends the measurement report to the source base station. The source base station initiates a handover pre-preparation in the Step A3 and sends a pre-prepared handover request to the target base station in the Step A4. In response to the pre-prepared handover request, the target base station sends a pre-prepared handover response including context of the target base station to the source base station in the Step A5. After receiving the pre-prepared handover response, the source base station sends a pre-prepared handover command to the UE for transferring the context of the target base station to. The UE does not immediately perform a handover to the target base station when receiving the pre-prepared handover command. The UE keeps the context of the target base station included in the pre-prepared handover command for a period of time. During that period of time, if the source base station is disconnected with core network entity (e.g. the home base station backhaul device), the source base station sends the specific indication to the UE in the Step A7. In the Step A8, the UE handovers to the target base station based on the context of the target base station saved earlier.

Figure 8:
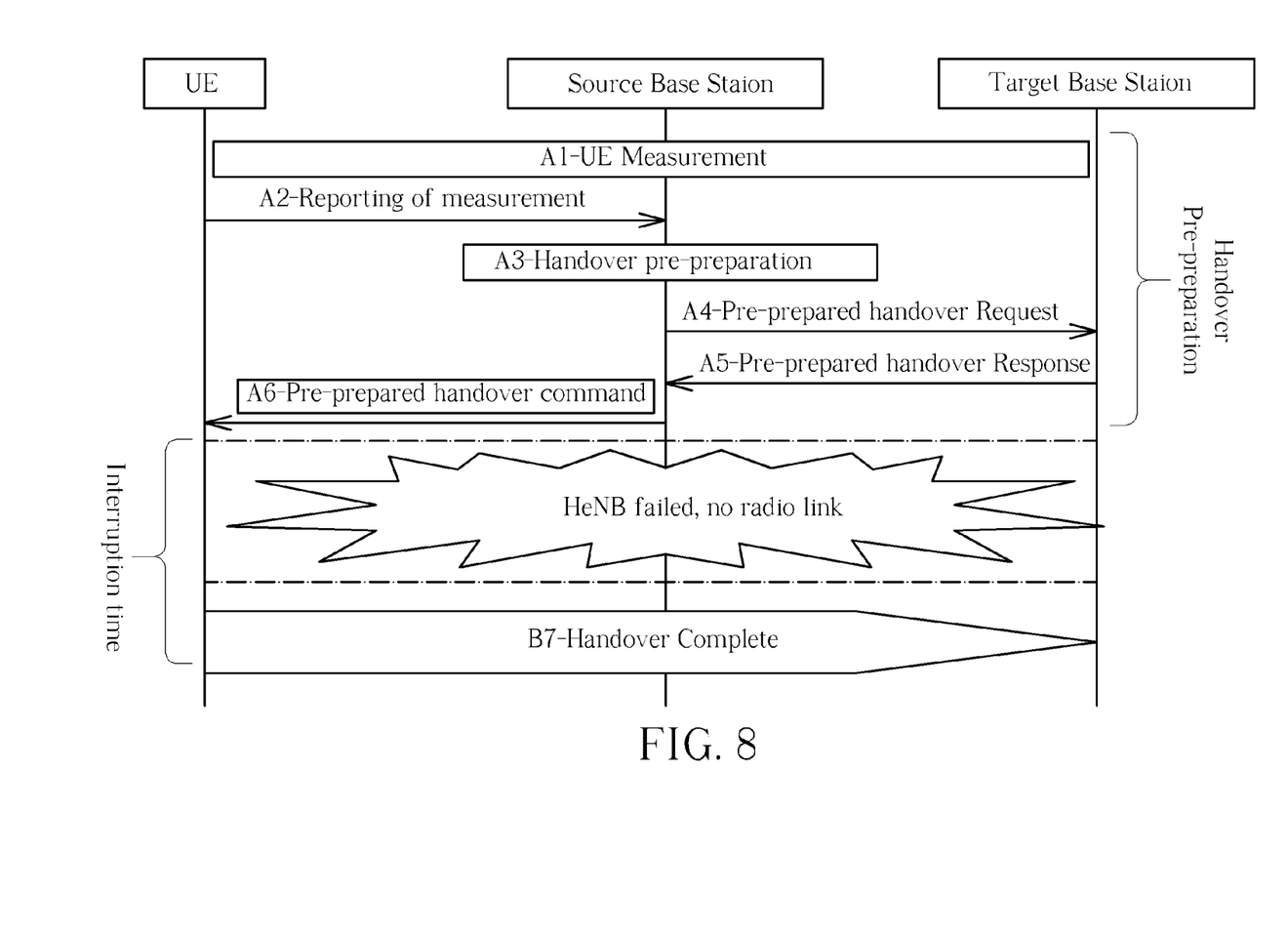
FIG. 8 is a signaling diagram according to another example.

Please refer to FIG. 8, which is a signaling diagram 80 according to another example. The Steps A1-A6 in FIG. 8 is the same as the Steps A1~A6 in FIG. 7. Thus, the detailed description could be found above and omitted herein. After the radio link failure is detected and confirmed, the UE automatically handovers to the target base station according to the context saved earlier without reception of the specific indication (Step A8).

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 30 in which the processor 300 processes the program code 314 related to the abovementioned processes and the processed results can initiate handover pre-preparation in the wireless communication system 20.

To sum up, the source base station prepares the context swapping between the UE and the target base station in advance. The UE and the target base station receive each other's context for the handover pre-preparation and keep the context for a period of time. When the backhaul link failure occurs or the source base station is not reliable due to unexpected hazard, the UE may handover to the target base station, using the context saved earlier after receiving the specific indication. The one bit indicator may be included in the pre-preparation handover request and the pre-preparation handover response to distinguish from the normal handover request and the normal handover response. Besides, when the radio link failure is detected, the UE may automatically perform the handover procedure to the target base station which already has kept the context of the UE, without reception of any specific indication from the source base station. Thus, the UE does not enter the RRC_IDLE state due to the backhaul link failure, radio link failure, and home base station unreliability.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of initiating handover pre-preparation for a mobile device in a wireless communication system, the method comprising the steps of:
   receiving a first pre-prepared handover command from a source base station, wherein the first pre-prepared handover command includes first context of a first target base station, whereby the mobile device does not perform a handover procedure when receiving the first pre-prepared handover command;
   starting a timer upon receiving the first pre-prepared handover command from the source base station and keeping the first context until the timer expires or the handover procedure is performed;
   receiving out-of-service information from the source base station, wherein the out-of-service information indicates out-of-service duration and an out-of-service cause; and
   determining whether to stay connected to a cell served by the source base station or to handover to the first target base station by using the first context, according to the out-of-service information.

2. The method of claim 1 further comprising the step of releasing the first context when the timer expires or when the mobile device receives a second pre-prepared handover command from the source base station, wherein the second pre-prepared handover command includes second context of a second target base station.

3. The method of claim 1 further comprising the step of:
performing the handover procedure to the first target base station based on the first context when a handover command corresponding to the first pre-prepared handover command is received from the source base station.

4. A communication device for initiating handover pre-preparation in a wireless communication system, the communication device comprises:
means for receiving a first pre-prepared handover command from a source base station, wherein the first pre-prepared handover command includes first context of a first target base station, whereby the mobile device does not perform a handover procedure when receiving the first pre-prepared handover command;
means for starting a first timer upon receiving the first pre-prepared handover command from the source base station and keeping the first context until the first timer expires or the handover procedure is performed;
means for receiving out-of-service information from the source base station, wherein the out-of-service information indicates out-of-service duration and an out-of-service cause; and
means for performing the handover procedure to the first target base station based on the first context when a handover command corresponding to the first pre-prepared handover command is received from the source base station.

5. The communication device of claim 4 further comprising a means for releasing the first context when the first timer expires or when the mobile device receives a second pre-prepared handover command from the source base station, wherein the second pre-prepared handover command includes second context of a second target base station.

6. The communication device of claim 4 further comprising:
means for determining whether to stay connected to a cell served by the source base station or to handover to the first target base station by using the first context, according to the out-of-service information.

7. A communication device for initiating handover pre-preparation in a wireless communication system, the communication device comprises:
means for receiving a first pre-prepared handover command from a source base station, wherein the first pre-prepared handover command includes first context of a first target base station, whereby the mobile device does not perform a handover procedure when receiving the first pre-prepared handover command;
means for starting a first timer upon receiving the first pre-prepared handover command from the source base station and keeping the first context until the first timer expires or the handover procedure is performed;
means for starting a second timer when the mobile device detects an abnormal radio link;
means for determining a radio link failure when the abnormal radio link is not recovered before the second timer expires; and
means for performing the handover procedure.

8. The communication device of claim 7, wherein the means for performing the handover procedure further comprises:
means for starting a third timer when the radio link failure is determined;
means for performing the handover procedure to the first target base by using the first context during running of the third timer; and
means for starting cell re-establishment to a cell served by a second base station before expiration of the third timer when the handover procedure fails.

9. The communication device of claim 7, wherein the means for performing the handover procedure further comprises:
means for performing the handover procedure to the first target base by using the first context when the radio link failure is determined;
means for starting a third timer when the handover procedure fails; and
means for starting cell re-establishment to a cell served by a second base station before the third timer expires.

* * * * *